US012536858B2

(12) United States Patent
Deguchi et al.

(10) Patent No.: US 12,536,858 B2
(45) Date of Patent: Jan. 27, 2026

(54) PAPER SHEET HANDLING APPARATUS

(71) Applicants: FUJITSU FRONTECH LIMITED, Tokyo (JP); FUJITSU FRONTECH SYSTEMS LIMITED, Maebashi (JP)

(72) Inventors: Shoichi Deguchi, Inagi (JP); Tomoyuki Tamahashi, Inagi (JP); Atsushi Ando, Inagi (JP); Satoshi Hayashi, Inagi (JP); Shohei Koizumi, Inagi (JP); Takashi Wada, Inagi (JP); Akira Yamada, Tokyo (JP)

(73) Assignees: FUJITSU FRONTECH LIMITED, Tokyo (JP); FUJITSU FRONTECH SYSTEMS LIMITED, Maebashi (JP)

( * ) Notice: Subject to any disclaimer, the term of this patent is extended or adjusted under 35 U.S.C. 154(b) by 701 days.

(21) Appl. No.: 17/820,054

(22) Filed: Aug. 16, 2022

(65) Prior Publication Data

US 2022/0392291 A1 Dec. 8, 2022

Related U.S. Application Data

(63) Continuation of application No. PCT/JP2020/007243, filed on Feb. 21, 2020.

(51) Int. Cl.

| | |
|---|---|
| ***G07D 11/14*** | (2019.01) |
| ***G07D 11/40*** | (2019.01) |
| *G07D 11/13* | (2019.01) |

(52) U.S. Cl.

CPC ............ *G07D 11/14* (2019.01); *G07D 11/40* (2019.01); *B65H 2301/4314* (2013.01); *G07D 11/13* (2019.01); *G07D 2211/00* (2013.01)

(58) Field of Classification Search

CPC ........ G07D 11/14; G07D 11/40; G07D 11/13; G07D 2211/00; B65H 2301/4223;

(Continued)

(56) References Cited

U.S. PATENT DOCUMENTS 4,995,195 A * 2/1991 Olberding .................. B60J 5/00 49/362
5,996,314 A * 12/1999 Pennini .................. B65H 29/40 53/399

(Continued)

FOREIGN PATENT DOCUMENTS

CN 109285268 A * 1/2019 ........... G07F 19/201
JP 2001097566 A 4/2001

(Continued)

OTHER PUBLICATIONS

English translation of JP 6052059 B2. (Year: 2016).*

(Continued)

*Primary Examiner* — Jeffrey A Shapiro
(74) *Attorney, Agent, or Firm* — GREER BURNS & CRAIN, LTD.

(57) ABSTRACT

A paper sheet handling apparatus includes: a first facing section and a second facing section which are arranged so as to face each other in a facing direction with an insertion space interposed therebetween; and a conveyance section that conveys a paper sheet. The first facing section includes a first shutter that openably closes a first opening portion, and is disposed so as to be movable, in the facing direction, (Continued)

to an insertion position at a time when the paper sheet is inserted and a conveyance position at a time when the paper sheet is conveyed. The first facing section and the conveyance section include first shutter opening/closing units which open the first opening portion by meshing with each other to open the first shutter when the first facing section moves from the insertion position to the conveyance position.

1 Claim, 14 Drawing Sheets

(58) Field of Classification Search
CPC ........ B65H 2301/4213; B65H 2301/42; B65H 2301/4314
USPC .................................... 194/351; 49/366, 370
See application file for complete search history.

(56) References Cited

U.S. PATENT DOCUMENTS

| | | | | |
|---|---|---|---|---|
| 6,334,610 | B1 | 1/2002 | Minamishin et al. | |
| 9,311,765 | B2 * | 4/2016 | Akamatsu | G07D 11/26 |
| 9,466,185 | B2 * | 10/2016 | Lee | G07F 19/00 |
| 10,013,838 | B2 * | 7/2018 | Qu | G07D 11/00 |
| 11,988,031 | B2 * | 5/2024 | Tan | E05F 15/665 |
| 2005/0082738 | A1 * | 4/2005 | Bryant | B65H 1/022 271/10.01 |
| 2008/0142583 | A1 * | 6/2008 | Yokoi | G07F 19/20 902/9 |
| 2012/0031728 | A1 * | 2/2012 | Lee | G07F 19/20 194/342 |
| 2017/0294068 | A1 | 10/2017 | Akagi et al. | |

FOREIGN PATENT DOCUMENTS

| | | | | |
|---|---|---|---|---|
| JP | 2008146388 | A | 6/2008 | |
| JP | 2010108159 | A | 5/2010 | |
| JP | 2015156130 | A | 8/2015 | |
| JP | 6052059 | B2 * | 12/2016 | G07D 11/14 |

OTHER PUBLICATIONS

English translation of CN 109285268 A (Year: 2018).*
Search report issued in corresponding European patent application No. EP 20 920 209.2, dated Oct. 20, 2023.
ISR issued in PCT/JP2020/007243, dated Apr. 7, 2020.
Written Opinion of the ISA issued in PCT/JP2020/007243, dated Apr. 7, 2020.

* cited by examiner

PAPER SHEET HANDLING APPARATUS

CROSS-REFERENCE TO RELATED APPLICATION

This application is continuation application of International Application PCT/JP2020/007243 filed on Feb. 21, 2020 and designated the U.S., the entire contents of which are incorporated herein by reference.

TECHNICAL FIELD

The present invention relates to a paper sheet handling apparatus.

BACKGROUND ART

Heretofore, a paper sheet insertion/withdrawal apparatus has been proposed, which includes: a first moving member between a pair of moving members which sandwich paper sheets inserted by a customer, the first moving member sandwiching the paper sheets from a side close to a feeding unit and moving the paper sheets from a position where the paper sheets are inserted into the feeding unit; rollers of the feeding unit, which protrude from a gap on the first moving member to a storage space of the paper sheets and convey the paper sheets; and a shield member driven by a motor to close the gap when the first moving member is located at the position where the paper sheets are inserted and to retreat when the first moving member moves to the feeding unit (for example, refer to Japanese Laid-open Patent Publication No. 2015-156130 A).

SUMMARY OF INVENTION

A paper sheet handling apparatus according to the disclosure includes: a first facing section and a second facing section which are arranged so as to face each other with an insertion space interposed therebetween, the insertion space having a paper sheet inserted from an insertion port; and a conveyance section that, in a state of protruding from a first opening portion of the first facing section toward the insertion space, conveys the paper sheet inserted into the insertion space, wherein the first facing section includes a first shutter that openably closes the first opening portion, the first facing section is disposed so as to be movable, in a facing direction where the first facing section and the second facing section face each other, to an insertion position at a time when the paper sheet is inserted and a conveyance position at a time when the paper sheet is conveyed by the conveyance section, and the first facing section and the conveyance section include first shutter opening/closing units which open the first opening portion by meshing with each other to open the first shutter when the first facing section moves from the insertion position to the conveyance position.

The object and advantages of the present invention will be realized by the elements set forth in the claims or combinations thereof.

DESCRIPTION OF EMBODIMENTS

Incidentally, in an automatic transaction apparatus such as an automated teller machine (ATM), a banknote insertion/withdrawal unit is disposed in order to insert a banknote to be deposited and in order to take out a banknote to be withdrawn. As such a banknote insertion/withdrawal unit as described above, there is a banknote insertion/withdrawal unit including: a stage and a roof which are arranged to face each other with an insertion space interposed therebetween, the insertion space having paper sheets inserted from an insertion port; and a conveyance section that conveys the paper sheets inserted into this insertion space in a state of protruding from an opening portion of the stage toward the insertion space.

When the opening portion is provided in the stage as described above, a foreign object enters an inside of the apparatus from the insertion space through the opening portion of the stage. Accordingly, if the opening portion of the stage is closed by arranging the above-mentioned shield member and motor in order to prevent the entry of the foreign object from the insertion space, then the motor is required, and in addition, a power transmission mechanism that transmits power from the motor to the shield member is required. Therefore, a structure of the banknote insertion/withdrawal unit will be complicated.

By taking an automatic transaction apparatus 100 as an example, a description will be given of a paper sheet handling apparatus according to an embodiment of the present invention with reference to the drawings.

Figure 1:
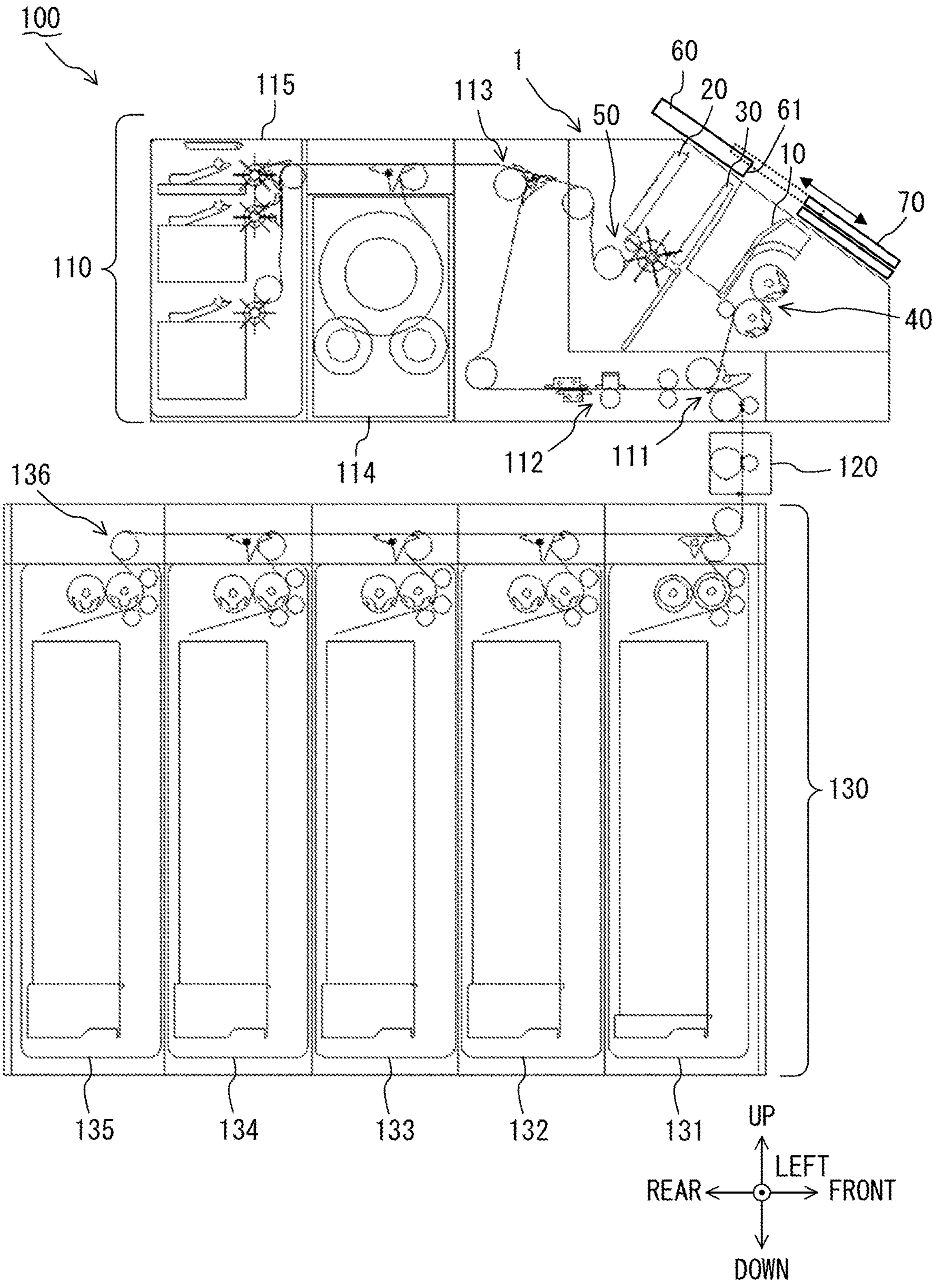
FIG. 1 is a left side view illustrating an internal configuration of an automatic transaction apparatus in an embodiment.

FIG. 1 is a left side view illustrating an internal configuration of the automatic transaction apparatus 100.

Note that up/down, front/rear and left/right directions illustrated in FIG. 1 and FIGS. 2A to 4B which will be mentioned later are merely examples in a case where a customer side of the automatic transaction apparatus 100 is in the front direction; however, for example, the up/down direction is a vertical direction, and the front/rear direction and the left/right direction are horizontal directions.

The automatic transaction apparatus 100 illustrated in FIG. 1 is, for example, an ATM, a bill recycle unit (BRU), a cash dispenser (CD), a teller cash recycler (TCR), or the like, and includes a main body unit 110, an intermediate conveyance section 120, and a storage unit 130. As an example, the main body unit 110 and the storage unit 130 are arranged in different spaces with a partition (not shown) interposed therebetween, and the intermediate conveyance section 120 conveys a banknote B (see FIG. 2A) so as to penetrate the above-described partition. Note that the banknote B is an example of paper sheets.

The main body unit 110 includes a banknote insertion/withdrawal unit 1, conveyance sections 111 and 113, an identification unit 112, a temporarily holding unit 114, and a reject unit 115.

Figure 9:
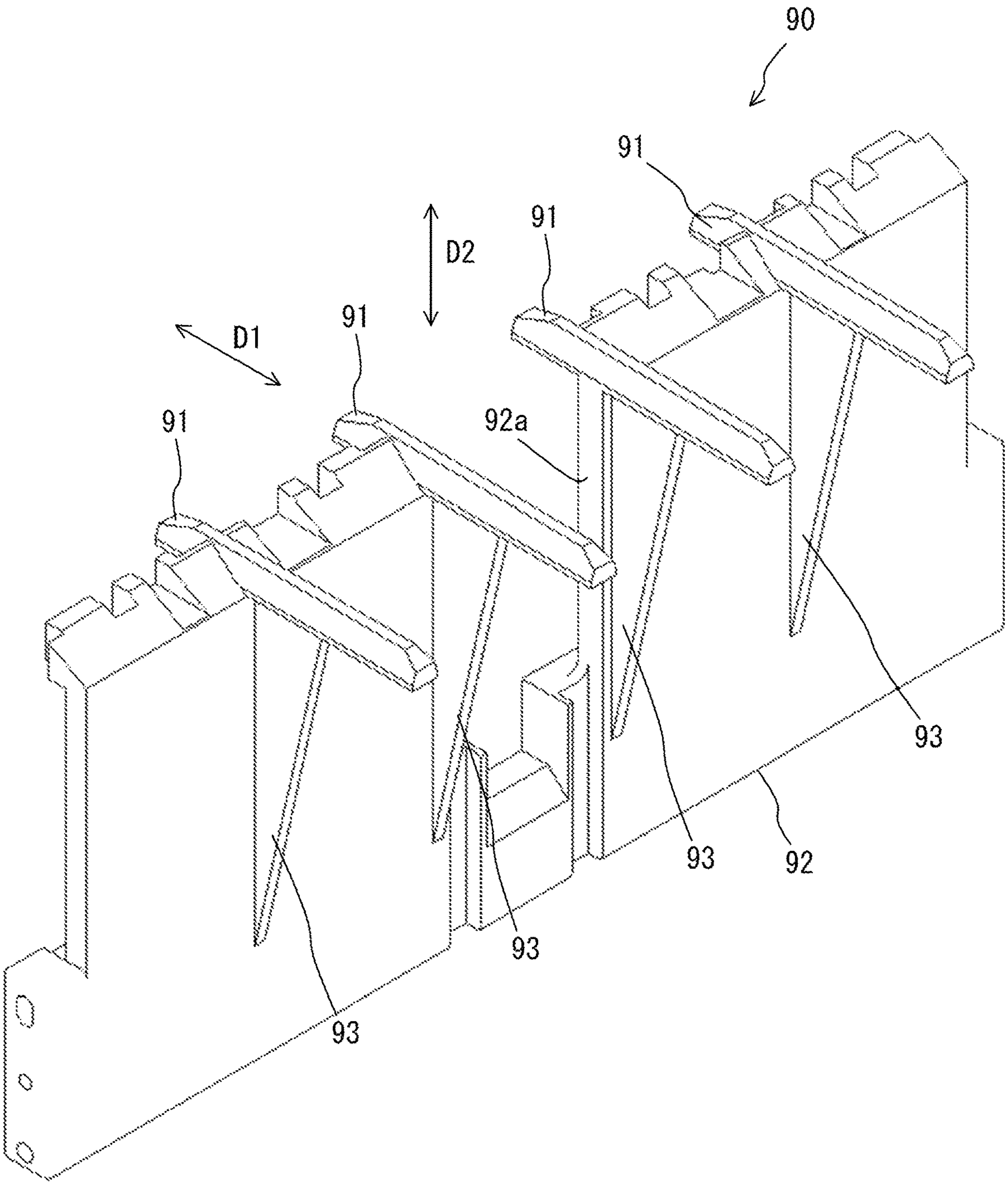
FIG. 9 is a perspective view illustrating a banknote receiving section in the embodiment.

The banknote insertion/withdrawal unit 1 includes a stage 10, a roof 20, a pusher 30, a taking-in conveyance section 40, a discharge conveyance section 50, a front panel 60, a shutter 70, a first contact section 80 (see FIG. 3A), and a banknote receiving section 90 (see FIG. 9). Note that only the banknote insertion/withdrawal unit 1 may be regarded as an example of the paper sheet handling apparatus.

The stage 10, the roof 20, the pusher 30, the taking-in conveyance section 40, the first contact section 80, and the banknote receiving section 90 will be described later with reference to FIGS. 3A to 3C, FIGS. 4A and 4B, and FIGS. 5 to 9. The taking-in conveyance section 40 conveys the banknote B, which is inserted between the stage 10 and the pusher 30, thereby taking the banknote B into the automatic transaction apparatus 100.

The discharge conveyance section 50 discharges the banknote B to between the roof 20 and the pusher 30.

On an upper front surface of the automatic transaction apparatus 100, the front panel 60 is disposed to be inclined with respect to the vertical direction and the horizontal direction so as to be located rearward as going upward. The front panel 60 is provided with an insertion/taking-out port 61.

The shutter 70 openably closes the insertion/taking-out port 61. Note that, in FIG. 1, the shutter 70 in an opened state is illustrated by a solid line, and the shutter 70 in a closed state is illustrated by a dotted line.

The conveyance section 111 conveys the banknote B from the banknote insertion/withdrawal unit 1 to the identification unit 112, and conveys the banknote B between the identification unit 112 and the intermediate conveyance section 120.

The identification unit 112 determines authenticity, dirt, corner bent and the like of the banknote B.

The conveyance section 113 conveys the banknote B between the identification unit 112 and the temporarily holding unit 114, and conveys the banknote B from the identification unit 112 to the banknote insertion/withdrawal unit 1.

The temporarily holding unit 114 temporarily stores the banknote B that is inserted into the banknote insertion/withdrawal unit 1 and determined to be normal in the identification unit 112.

The reject unit 115 stores a banknote B, which is not to be returned, among such banknotes B determined to be abnormal in the identification unit 112.

The intermediate conveyance section 120 conveys the banknote B between the main body unit 110 and the storage unit 130.

The storage unit 130 is disposed below the main body unit 110, and includes a plurality of banknote storage cassettes 131, 132, 133, 134, and 135, and a storage conveyance section 136.

The plurality of banknote storage cassettes 131 to 135 store, for example, such banknotes B of which money types are different from one another. The banknote storage cassettes 131 to 135 are capable of discharging the banknotes B stored therein. Therefore, the banknotes B stored in the banknote storage cassettes 131 to 135 are used for withdrawal.

The storage conveyance section 136 conveys the banknotes B between the intermediate conveyance section 120 and the respective banknote storage cassettes 131 to 135.

Figure 2A:
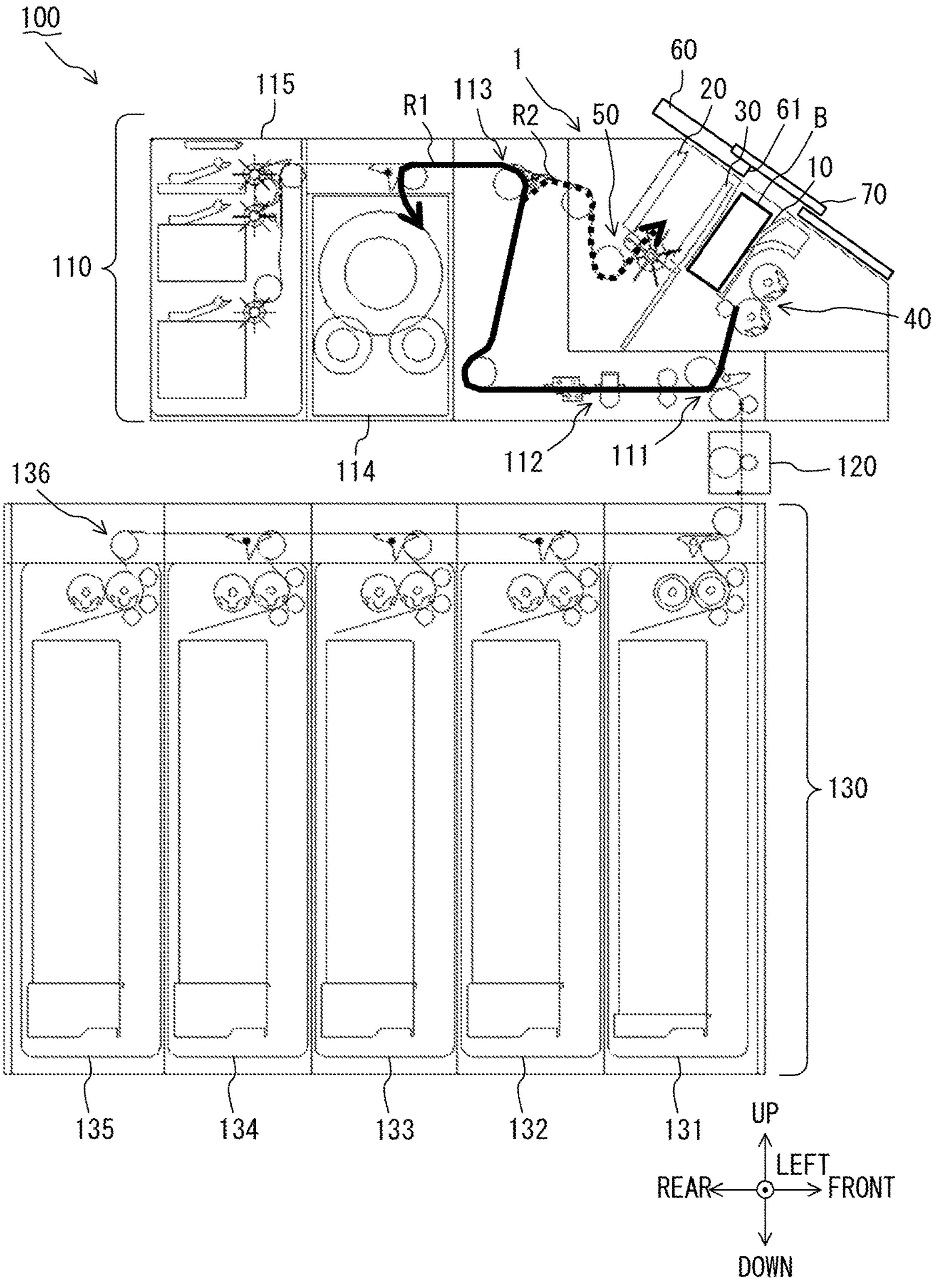
FIG. 2A is an explanatory view (No. 1) for explaining a banknote conveyance route of the automatic transaction apparatus in the embodiment.
Figure 2B:
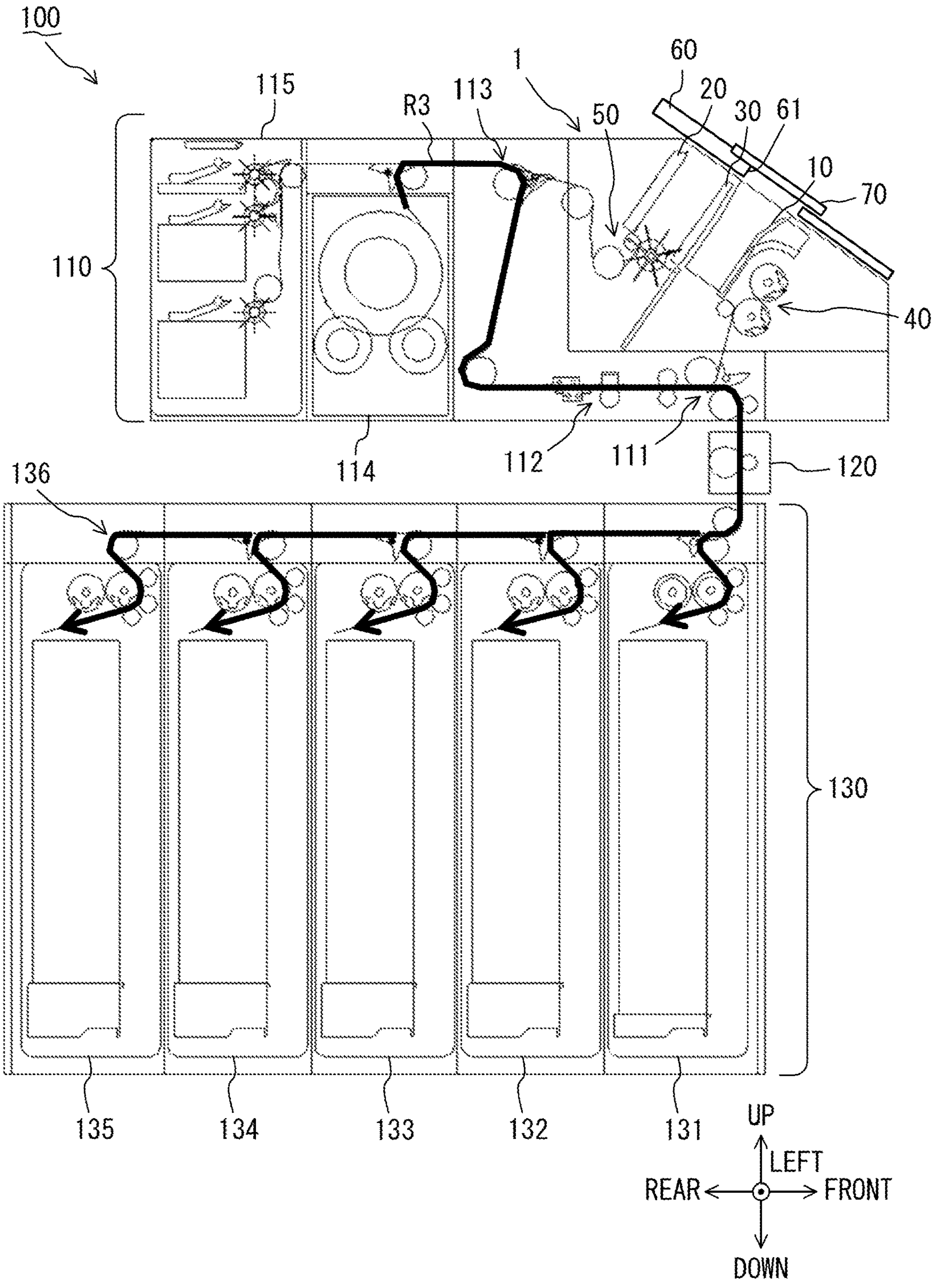
FIG. 2B is an explanatory view (No. 2) for explaining the banknote conveyance route of the automatic transaction apparatus in the embodiment.
Figure 2C:
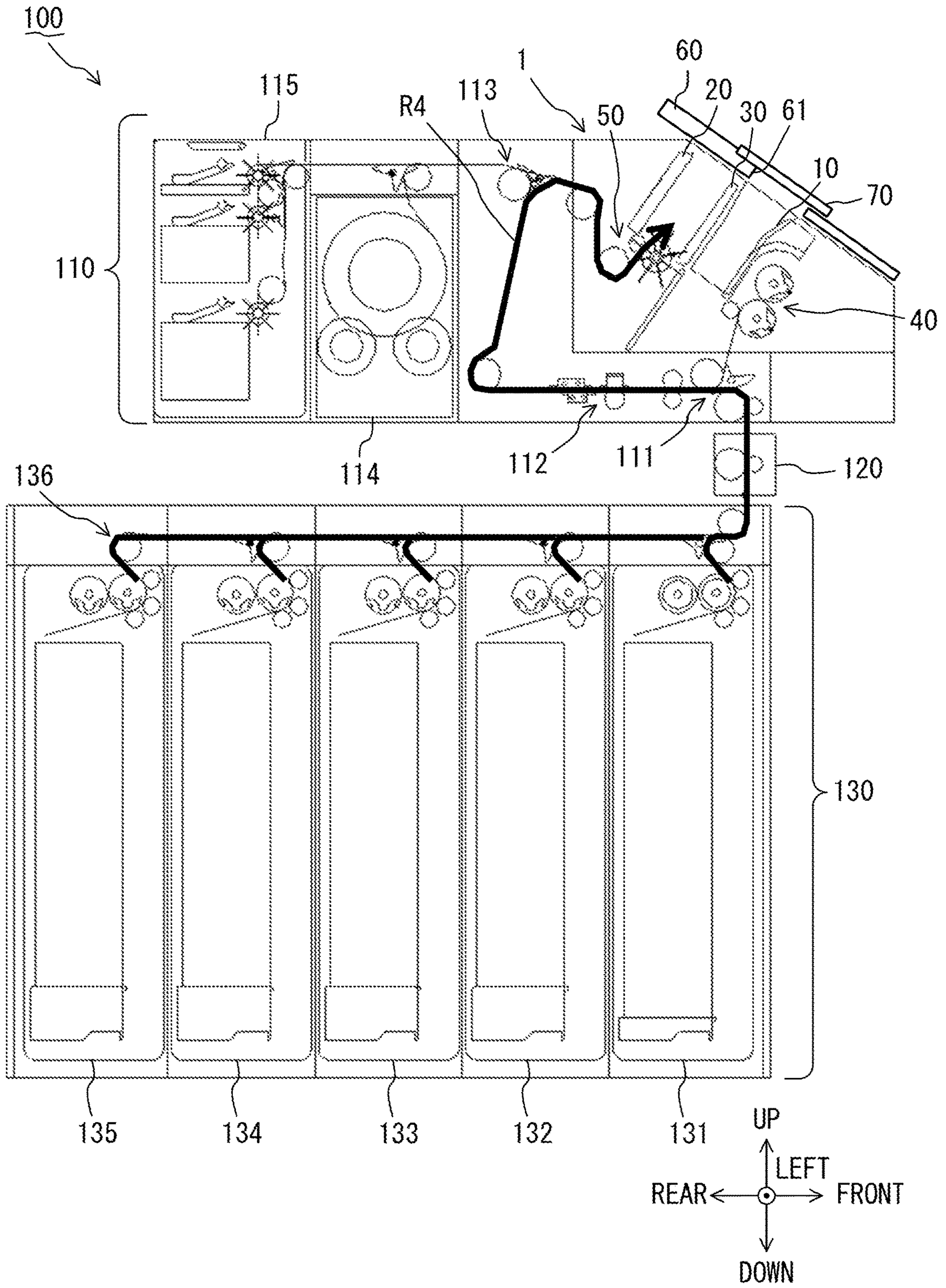
FIG. 2C is an explanatory view (No. 3) for explaining the banknote conveyance route of the automatic transaction apparatus in the embodiment.

FIGS. 2A to 2C are explanatory views for explaining conveyance routes R1 to R4 of the automatic transaction apparatus 100 for the banknotes B.

First, as in the conveyance route R1 shown by a thick solid arrow in FIG. 2A, such banknotes B inserted into the banknote insertion/withdrawal unit 1 are conveyed to the identification unit 112 by the taking-in conveyance section 40 and the conveyance section 111. Moreover, such banknotes B determined to be normal in the identification unit 112 are conveyed to the temporarily holding unit 114 by the conveyance section 113.

Meanwhile, as in the conveyance route R2 shown by a thick dotted arrow in FIG. 2A, such banknotes B (counterfeit banknotes and the like) determined to be abnormal in the identification unit 112 are returned to the banknote insertion/withdrawal unit 1 by the conveyance section 113 and the discharge conveyance section 50.

As in the conveyance route R3 shown by a thick solid arrow in FIG. 2B, such banknotes B temporarily stored in the temporarily holding unit 114 are conveyed to the respective banknote storage cassettes 131 to 135 by the conveyance section 113, the identification unit 112, the conveyance section 111, the intermediate conveyance section 120, and the storage conveyance section 136.

As in the conveyance route R4 shown by a thick solid arrow in FIG. 2C, the banknotes B stored in the respective banknote storage cassettes 131 to 135 are discharged, at the time of withdrawal, to the banknote insertion/withdrawal unit 1 by the storage conveyance section 136, the intermediate conveyance section 120, the conveyance section 111, the identification unit 112, the conveyance section 113, and the discharge conveyance section 50.

Next, a description will be given of a banknote inserting operation and remaining banknote taking-in operation of the banknote insertion/withdrawal unit 1.

Figure 3A:
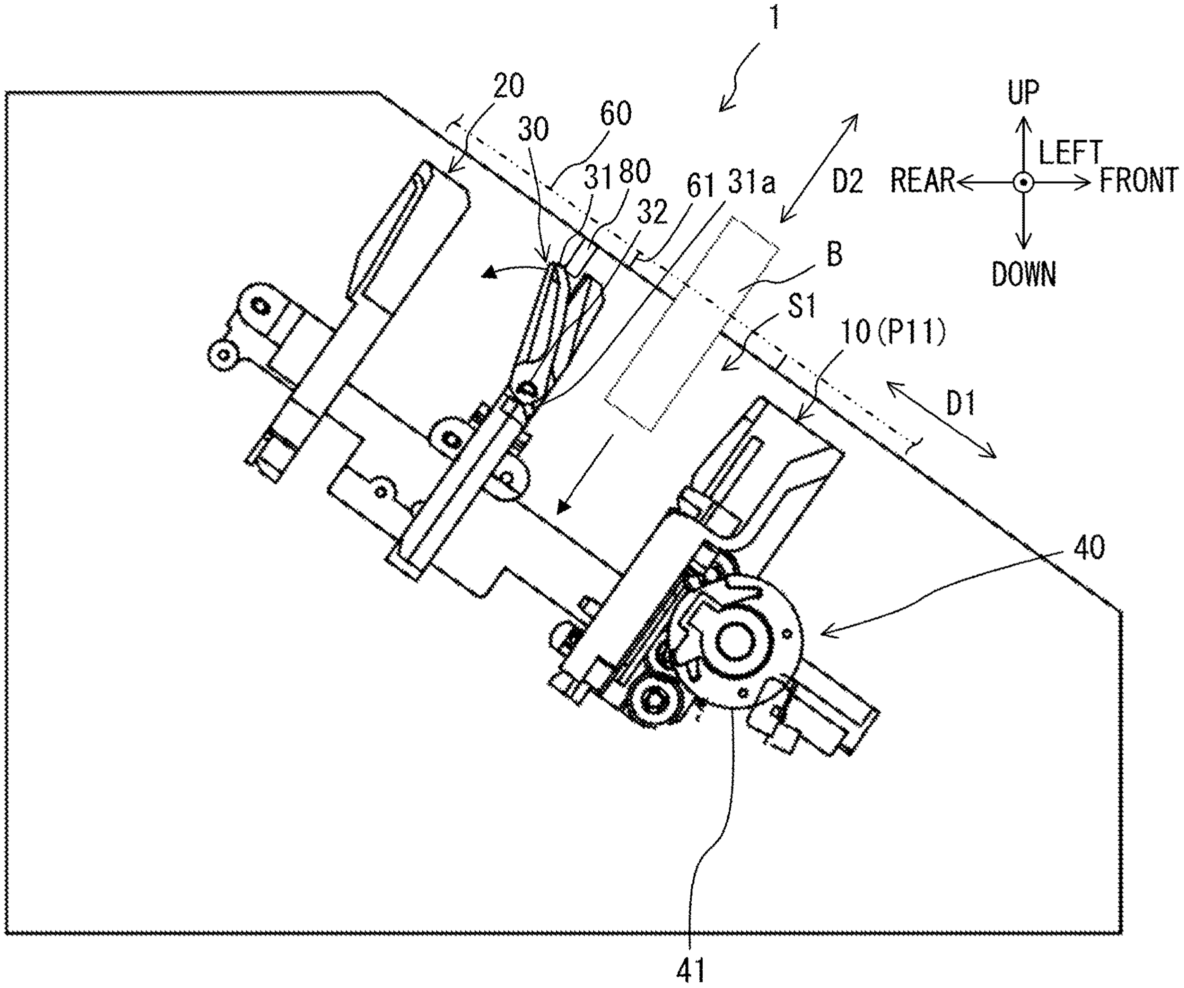
FIG. 3A is an explanatory view (No. 1) for explaining a banknote inserting operation of a banknote insertion/withdrawal unit in the embodiment.
Figure 3B:
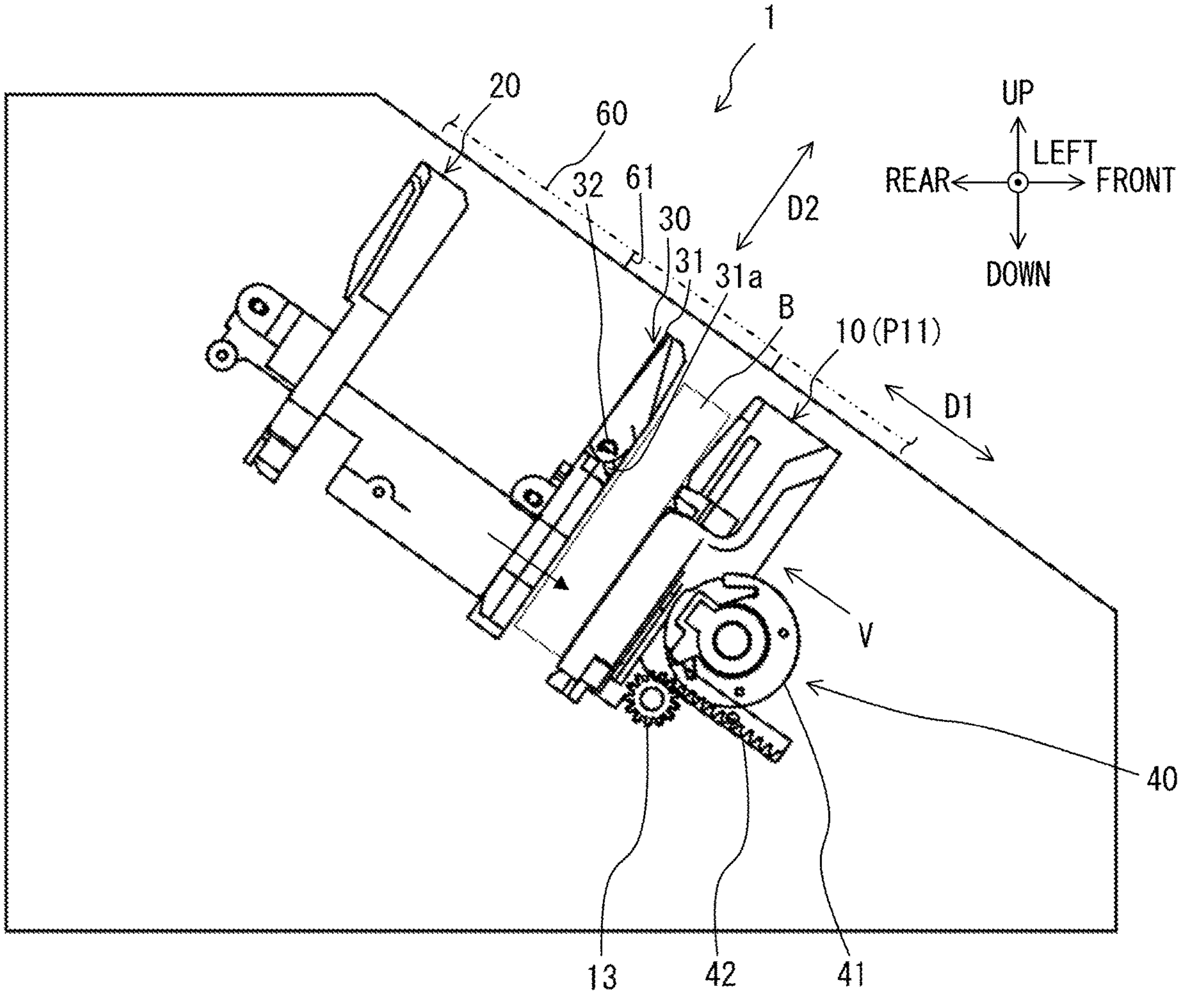
FIG. 3B is an explanatory view (No. 2) for explaining the banknote inserting operation of the banknote insertion/withdrawal unit in the embodiment.
Figure 3C:
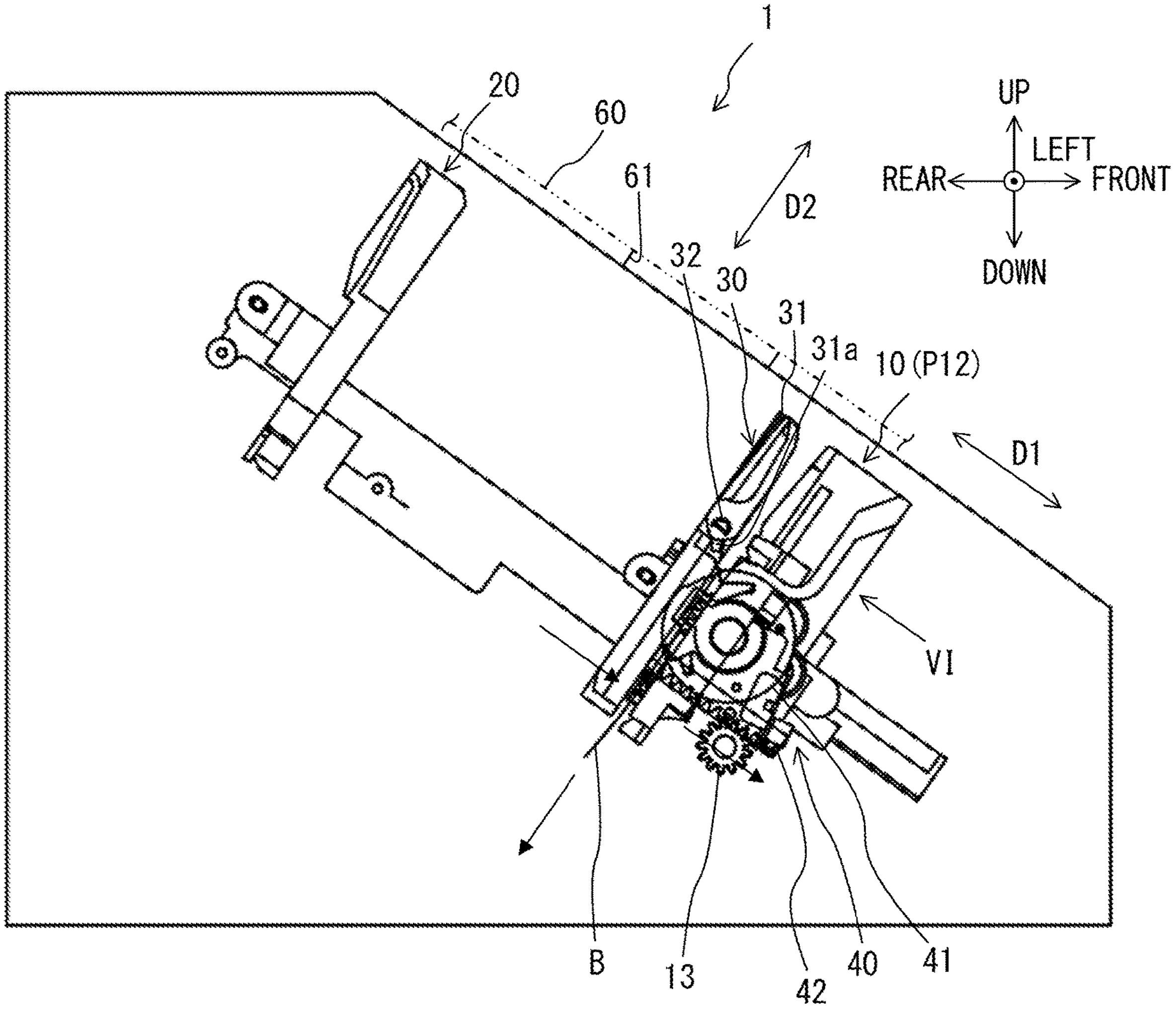
FIG. 3C is an explanatory view (No. 3) for explaining the banknote inserting operation of the banknote insertion/withdrawal unit in the embodiment.

FIGS. 3A to 3C are explanatory views for explaining the banknote inserting operation of the banknote insertion/withdrawal unit 1.

Figure 4A:
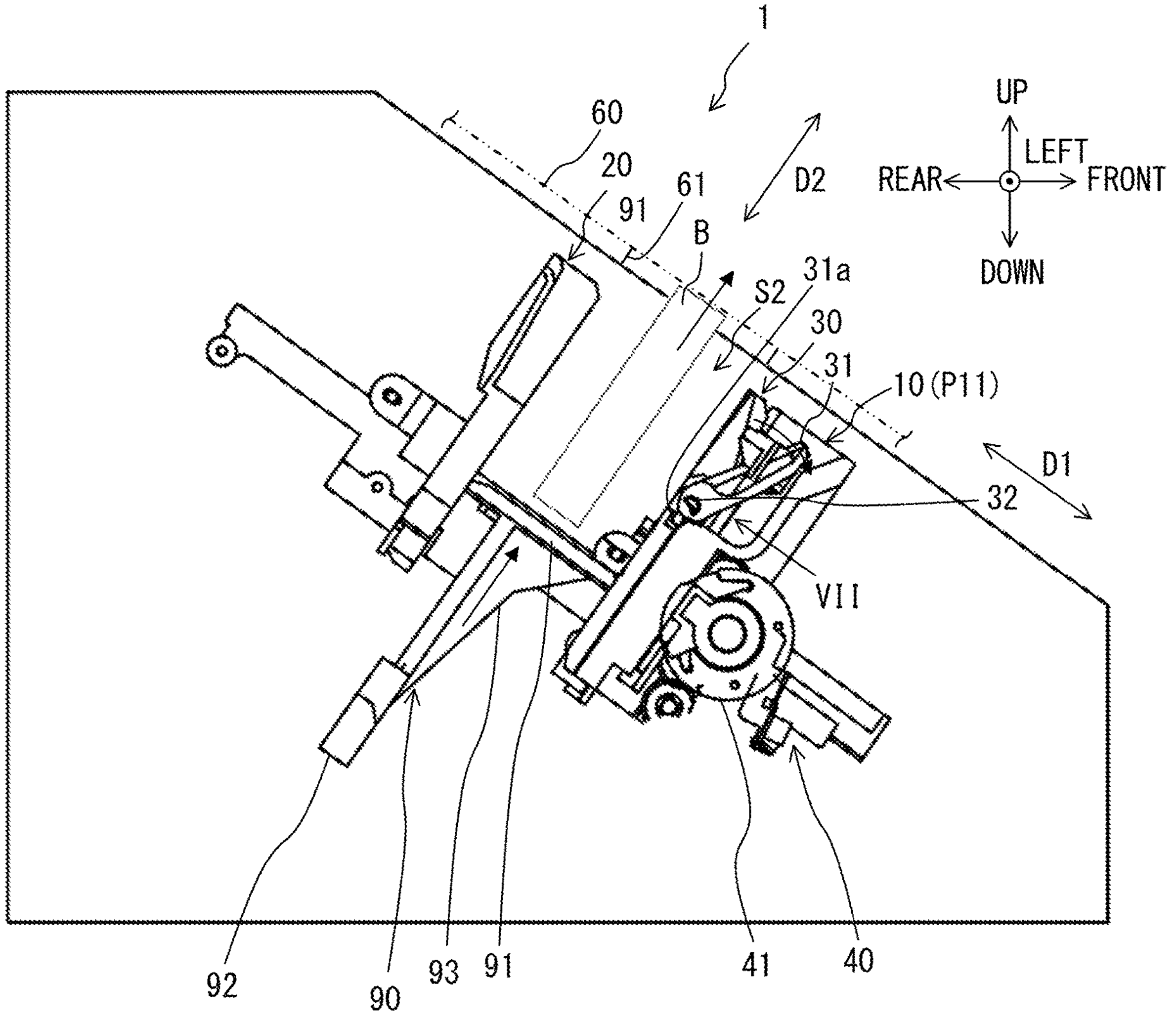
FIG. 4A is an explanatory view (No. 1) for explaining a remaining banknote taking-in operation of the banknote insertion/withdrawal unit in the embodiment.
Figure 4B:
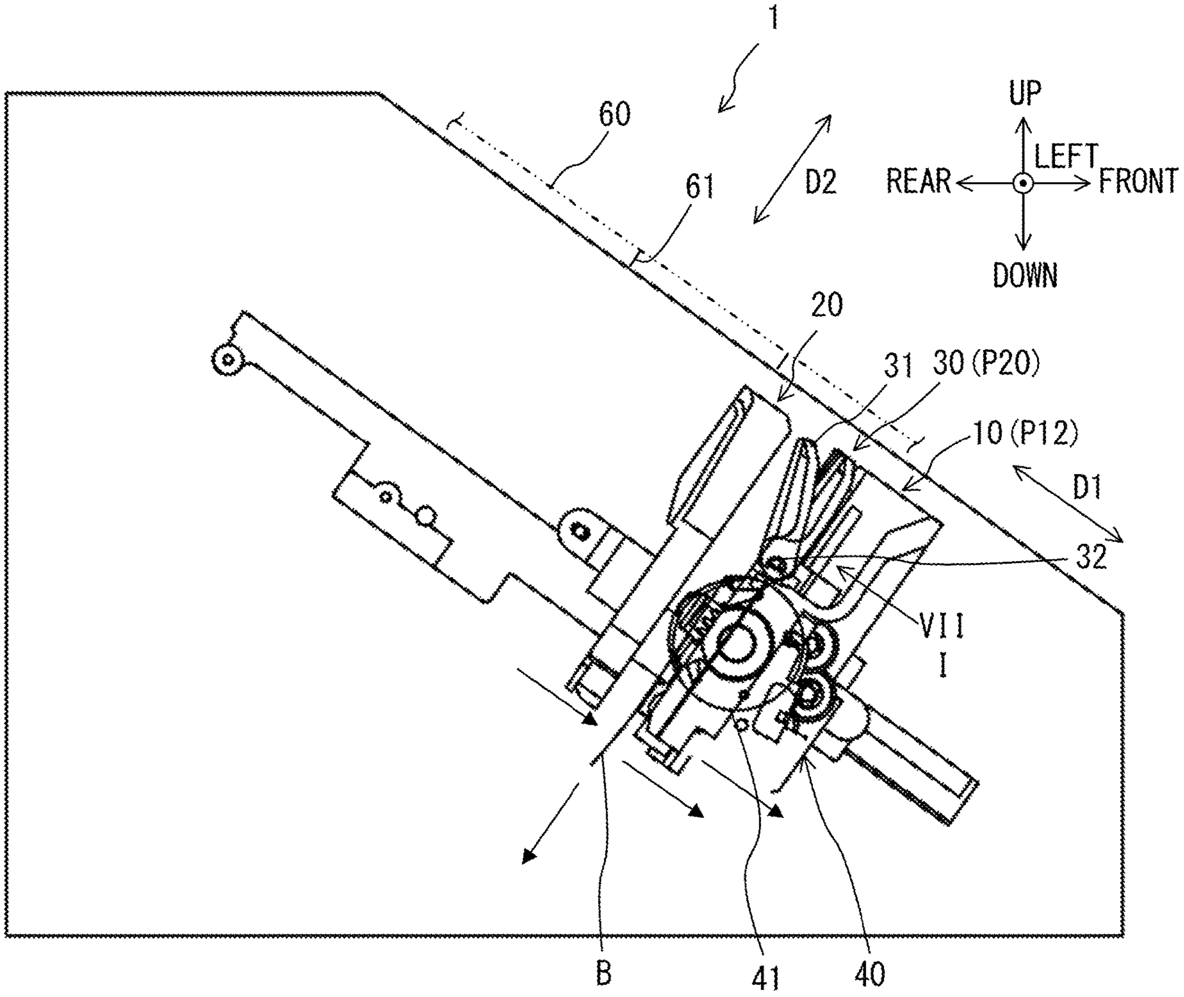
FIG. 4B is an explanatory view (No. 2) for explaining the remaining banknote taking-in operation of the banknote insertion/withdrawal unit in the embodiment.

FIGS. 4A and 4B are explanatory views for explaining the remaining banknote taking-in operation of the banknote insertion/withdrawal unit 1.

Figure 5:
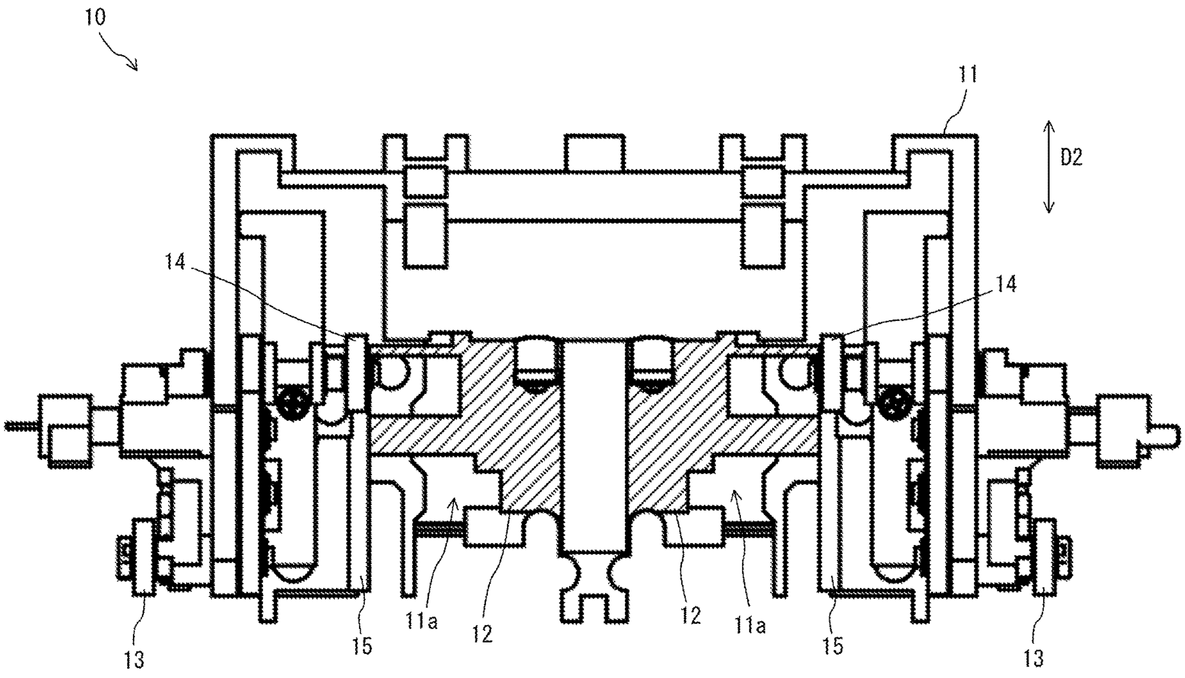
FIG. 5 is a view of a stage in the embodiment when viewed from a direction V in FIG. 3B.

FIG. 5 is a view of the stage 10 when viewed from a direction V in FIG. 3B.

Figure 6:
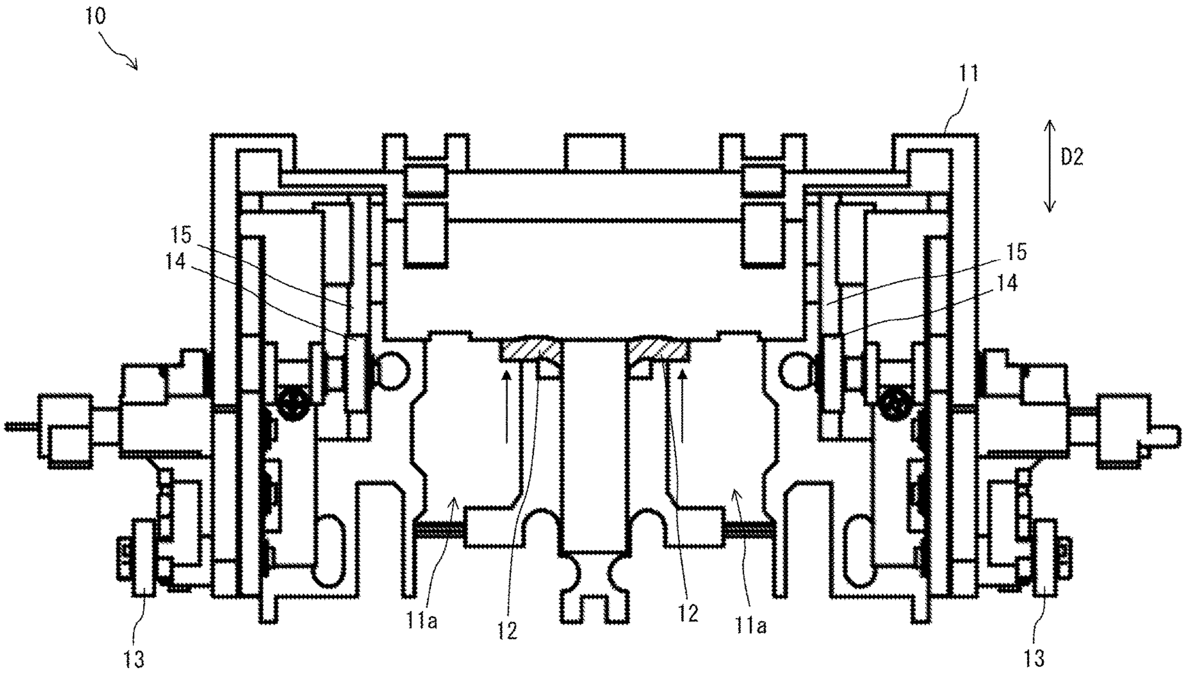
FIG. 6 is a view of the stage in the embodiment when viewed from a direction VI in FIG. 3C.

FIG. 6 is a view of the stage 10 when viewed from a direction VI in FIG. 3C.

Figure 7:
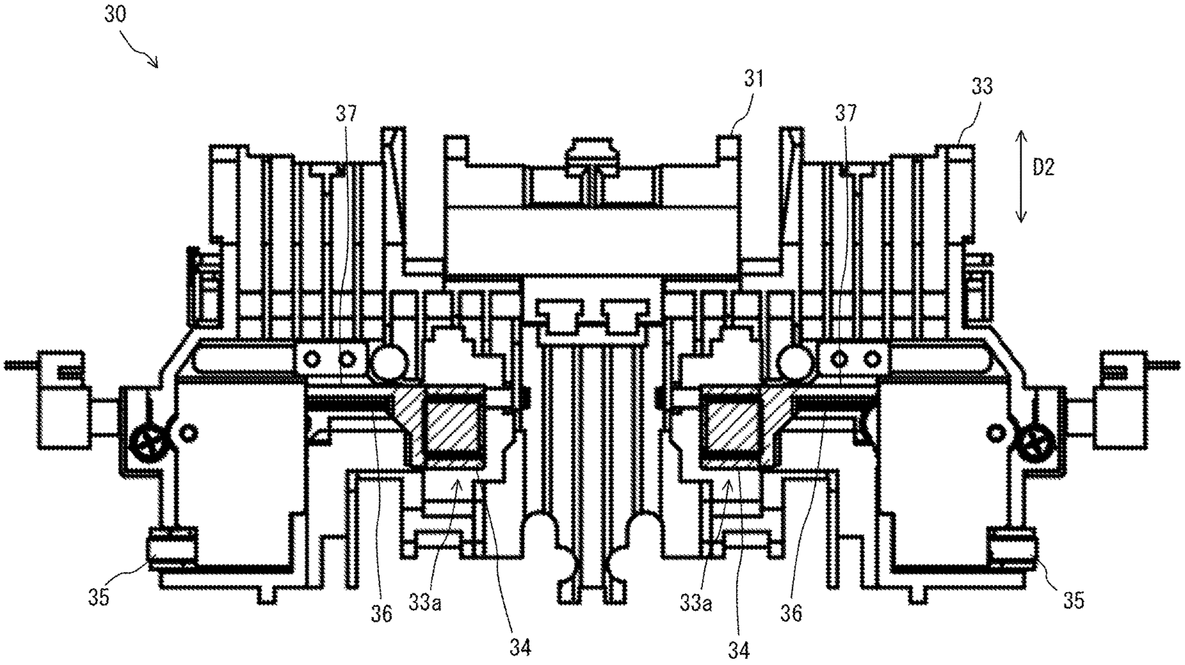
FIG. 7 is a view of a pusher in the embodiment when viewed from a direction VII in FIG. 4A.

FIG. 7 is a view of the pusher 30 when viewed from a direction VII in FIG. 4A.

Figure 8:
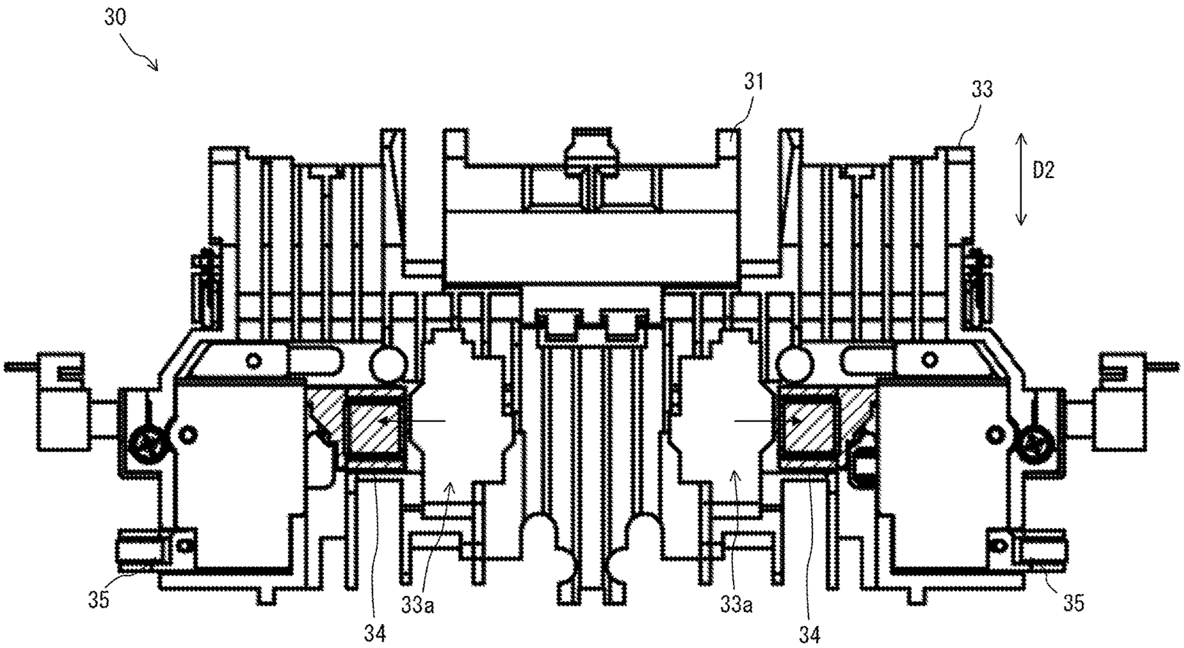
FIG. 8 is a view of the pusher in the embodiment when viewed from a direction VIII in FIG. 4B.

FIG. 8 is a view of the pusher 30 when viewed from a direction VIII in FIG. 4B.

FIG. 9 is a perspective view illustrating the banknote receiving section 90.

First, a description will be given of configurations of the stage 10, the roof 20, the pusher 30, the first contact section 80, and the banknote receiving section 90.

As illustrated in FIG. 3A, the stage 10 and the roof 20 are arranged so as to face each other with an insertion space S1 interposed therebetween. Into this insertion space S1, the banknote B is inserted from the insertion/taking-out port 61 of the front panel 60, which is shown by a chain double-dashed line in each of FIGS. 3A to 4B.

In parallel to an insertion/taking-out direction D2 where the banknote B is inserted and taken out, the stage 10 and the roof 20 are arranged to be inclined in the vertical direction and the horizontal direction so as to be located upward as going forward. Therefore, a facing direction D1 where the stage 10 and the roof 20 face each other is perpendicular to the insertion/taking-out direction D2, and is inclined in the vertical direction and the horizontal direction so as to be located upward as going rearward.

As illustrated in FIG. 5, the stage 10 includes a stage main body 11, two first shutters 12 (hatched portions), two gears 13, two gears 14, and two racks 15. Note that the stage 10 is an example of a first facing section.

As illustrated in FIGS. 3A to 3C, the stage 10 is disposed so as to be movable to an insertion position P11 (see FIGS. 3A and 3B) at the time when the banknote B is inserted and a conveyance position P12 (see FIG. 3C) at the time when the banknote B is conveyed by pick rollers 41 in the facing direction D1 where the stage 10 and the roof 20 face each other.

As illustrated in FIGS. 5 and 6, the stage main body 11 is provided with two first opening portions 11*a* penetrated by the pick rollers 41 of the taking-in conveyance section 40 to be described later.

The two first shutters 12 openably close the first opening portions 11*a*.

The two gears 13 are provided on left and right end portions on a lower end of the stage 10 (the stage main body 11). At the time when the stage 10 moves from the insertion position P11 illustrated in FIGS. 3A and 3B to the conveyance position P12 illustrated in FIG. 3C, the two gears 13 rotate by meshing with two racks 42 of the taking-in conveyance section 40 to be described later.

The two gears 14 rotate following the rotation of the two gears 13.

The two racks 15 move up and down following the rotation of the two gears 14. The two racks 15 are provided integrally with the first shutters 12, or are fixed to the first shutters 12.

Therefore, when the stage 10 moves from the insertion position P11 illustrated in FIGS. 3A and 3B to the conveyance position P12 illustrated in FIG. 3C, the two gears 13 rotate by meshing with the two racks 42 of the taking-in conveyance section 40, whereby the two gears 14 rotate, the two racks 15 ascend, and the two first shutters 12 ascend. Thus, as illustrated in FIG. 6, the two first shutters 12 open so as to open the two first opening portions 11*a*.

Meanwhile, when the stage 10 moves from the conveyance position P12 illustrated in FIG. 3C to the insertion position P11 illustrated in FIGS. 3A and 3B, the two gears 13 reversely rotate by meshing with the two racks 42 of the taking-in conveyance section 40, whereby the two gears 14 reversely rotate, the two racks 15 descend, and the two first shutters 12 descend. Thus, as illustrated in FIG. 6, the two first shutters 12 close the two first opening portions 11*a*.

Herein, the two gears 13, the two gears 14 and the two racks 15 in the stage 10 are an example of a first shutter opening/closing unit provided in the stage 10. Moreover, the two racks 42 of the taking-in conveyance section 40 are an example of a first shutter opening/closing unit provided in the taking-in conveyance section 40.

Note that an opening/closing direction of the two first shutters 12 is not limited to the up/down direction, and may be the left/right direction. Further, the two first shutters 12 may move not upward but downward when opening. As described above, the opening/closing direction of the first shutters 12 is arbitrary. Moreover, though two pieces of the first opening portions 11*a* are provided according to the number of pick rollers 41, the number may be one, or may be three or more. Further, when the first shutter 12 that is single closes a plurality of the first opening portions 11*a*, the number of first shutters 12 may be smaller than the number of first opening portions 11*a*.

The roof 20 is movable in the facing direction D1. Note that the roof 20 is an example of a second facing section.

As illustrated in FIG. 7, the pusher 30 includes a movable member 31, a rotating shaft 32, a pusher main body 33, two second shutters 34 (hatched portions), two rollers 35, two gears 36, and two racks 37.

As illustrated in FIG. 3A, the pusher 30 is an example of a partition section disposed between the stage 10 and the roof 20 so as to be movable in the facing direction D1 of the stage 10 and the roof 20. The pusher 30 forms, with the stage 10, the insertion space S1 into which the banknote B is inserted from the insertion/taking-out port 61. Further, as illustrated in FIG. 4A, the pusher 30 forms, with the roof 20, a taking-out space S2 in which the banknote B is taken out from the insertion/taking-out port 61.

Moreover, the pusher 30 includes a movable member 31 that is provided on a tip end thereof close to the insertion/taking-out port 61 and is movable toward both of the stage 10 (see FIG. 4A) and the roof 20 (see FIG. 3A). As illustrated in FIG. 7, this movable member 31 is recommended to be provided, for example, on only a part of the vicinity of the center of the pusher 30 (the pusher main body 33) in the left/right direction (the left/right direction also in FIG. 7) that intersects the facing direction D1 and the insertion/taking-out direction D2.

As illustrated in FIG. 3A, the movable member 31 is supported so as to be rotatable about the rotating shaft 32 taken as a rotating center. Moreover, by an elastic body such as a torsion spring, the movable member 31 is recommended to be urged so as to continue to be parallel to the stage 10 and the roof 20. In the movable member 31, on an opposite side thereof to the insertion/taking-out port 61 with the rotating shaft 32 interposed therebetween, a pressed protrusion 31*a* that protrudes downward (toward the stage 10) is provided.

As illustrated in FIGS. 7 and 8, the pusher main body 33 is provided with two second opening portions 33*a* penetrated by the two pick rollers 41 of the taking-in conveyance section 40 to be described later.

The two second shutters 34 openably close the second opening portions 33*a*.

The two rollers 35 are provided on left and right end portions on a lower end of the pusher 30 (the pusher main body 33). When the pusher 30 is located at a position other than a remaining banknote conveyance position P20 illustrated in FIG. 4B, the two rollers 35 are pressurized toward the center in the left/right direction by guides (not shown).

When the pusher 30 moves to the remaining banknote conveyance position P20 illustrated in FIG. 4B, the two rollers 35 are released from such a pressurized state brought by the guides (not shown), and move so as to separate from each other in the left/right direction.

The two gears 36 rotate in conjunction with motions of the two rollers 35 to separate from each other in the left/right direction.

The two racks 37 move in the left/right direction following the rotation of the two gears 36. The two racks 37 are provided integrally with the second shutters 34, or are fixed to the second shutters 34.

Therefore, when the pusher 30 moves together with the stage 10 from the position at the time of insertion, which is illustrated in FIG. 4A, to the remaining banknote conveyance position P20 illustrated in FIG. 4B, the two rollers 35 are released from the pressurized state brought by the guides (not shown), whereby the two gears 36 rotate, and together with the two second shutters 34, the two racks 37 move so as to separate from each other in the left/right direction. Thus, as illustrated in FIG. 8, the second shutters 34 open so as to open the second opening portions 33*a*.

Meanwhile, when the pusher 30 moves from the remaining banknote conveyance position P20 illustrated in FIG. 4B to the position at the time of insertion, which is illustrated in FIG. 4A, the two rollers 35 move opposite to each other, whereby the two gears 36 move reversely, and together with the two second shutters 34, the two racks 37 move so as to approach each other in the left/right direction. Thus, as illustrated in FIG. 7, the second shutters 34 close the second opening portions 33*a*.

Herein, the two rollers 35, the two gears 36 and the two racks 37 in the pusher 30 are an example of a second shutter opening/closing unit that opens and closes the second shutters 34.

Note that an opening/closing direction of the two second shutters 34 is not limited to the left/right direction, and may be the up/down direction. Moreover, when opening, the two second shutters 34 may move not in such a mutually separating direction but in a mutually approaching direction. As described above, the opening/closing direction of the second shutters 34 is arbitrary. Moreover, though two pieces of the second opening portions 33*a* are provided according to the number of pick rollers 41, the number may be one, or may be three or more. Further, when the second shutter 34 that is single closes a plurality of the second opening portions 33*a*, the number of second shutters 34 may be smaller than the number of second opening portions 33*a*. Moreover, when the banknote insertion/withdrawal unit 1 is used for only inserting the banknote B, the pusher 30 does not have to be disposed. Moreover, the two rollers 35 may be provided with guides (not shown) so as to be pressurized toward the center in the left/right direction by the remaining banknote conveyance position P20, and the two second shutters 34 may be provided so as to open when the two rollers 35 are in the pressurized state.

The taking-in conveyance section 40 illustrated in FIG. 3B includes the pick rollers 41 and the racks 42. Though not shown in FIG. 3B, two pieces of the pick rollers 41 and two pieces of the racks 42 are arranged.

As illustrated in FIG. 3C, in a state of protruding to the insertion space S1 (see FIG. 3A) from the two first opening portions 11*a* of the stage 10, the two pick rollers 41 convey the banknote B inserted into this insertion space S1. Herein, the taking-in conveyance section 40 is an example of a conveyance section that conveys the banknote B, which is inserted into the insertion space S1, in the state of protruding to the insertion space S1 from the first opening portions 11*a* of the stage 10.

Moreover, as illustrated in FIG. 4B, in a state of protruding to the taking-out space S2 (see FIG. 4A) from the two first opening portions 11*a* (see FIG. 5) of the stage 10 and the two second opening portions 33*a* (see FIG. 7) of the pusher 30, the two pick rollers 41 convey the banknote B that remains in the taking-out space S2.

As illustrated in FIG. 3C, the two racks 42 mesh with the two gears 13 of the stage 10 as mentioned above.

Note that the taking-in conveyance section 40 may be disposed not on the stage 10 but on the roof 20. In that case, the first opening portions 11*a* and the first shutters 12 are disposed not on the stage 10 but on the roof 20.

Incidentally, in the banknote insertion/withdrawal unit 1, unlike the roof 20, the stage 10 is located below the insertion space S1 and the taking-out space S2. Accordingly, as compared with such a case where the first opening portions are provided in the roof 20, a foreign object is apt to enter the inside of the banknote insertion/withdrawal unit 1 from the first opening portions 11*a* of the stage 10. However, as in the present embodiment, there is a case where, due to restrictions on an apparatus structure of the banknote insertion/withdrawal unit 1, the banknote B is conveyed in a state where the taking-in conveyance section 40 is disposed not on the roof 20 but on the stage 10 and protrudes to the insertion space S1 from the first opening portion 11*a* of the stage 10. Particularly in this case, such a foreign object is apt to fall to the inside of the banknote insertion/withdrawal unit 1 from the first opening portions 11*a*. In the present embodiment, as mentioned above, the first shutters 12 which openably close the first opening portions 11*a* are disposed, and accordingly, the foreign object can be prevented from falling to the inside of the banknote insertion/withdrawal unit 1 from the first opening portions 11*a*.

As illustrated in FIG. 3A, the first contact section 80 is a protrusion that is provided behind the insertion/taking-out port 61 and protrudes downward from the back surface of the front panel 60.

As illustrated in FIG. 9, the banknote receiving section 90 includes four support members 91, a base portion 92, and four reinforcement portions 93. The banknote receiving section 90 is disposed so as to be movable in the insertion/taking-out direction D2, that is, in the direction of approaching and separating from the taking-out port 61.

The support members 91 are arms which support the banknote B. The support members 91 are arranged in the taking-out space S2 so as to face the insertion/taking-out port 61 as illustrated in FIG. 4A.

The four support members 91 are fixed to the base portion 92. The base portion 92 is provided with a recessed portion 92*a* for avoiding interference with the pusher 30.

In order to reinforce the support members 91, the four reinforcement portions 93 are provided between the respective support members 91 and the base portion 92, and exhibit a triangular plate shape.

A description will be given below of a flow of the banknote inserting operation and remaining banknote taking-in operation of the banknote insertion/withdrawal unit 1.

As illustrated in FIG. 3A, at the time when the banknote B is inserted, the pusher 30 forms the insertion space S1 with the stage 10. At this time, the movable member 31 moves so as to be inclined toward the roof 20 by coming into contact with the first contact section 80 and being pressed against elastic force of the above-described elastic body. Thus, the insertion space S1 (between the pusher 30 and the stage 10)

is widened toward the insertion/taking-out port 61, and accordingly, it is made easy for a customer to insert the banknote B. Note that the movable member 31 may move so as to be inclined toward the roof 20 by, for example, power of driving means (not shown).

As illustrated in FIG. 3B, after the insertion of the banknote B is completed, the pusher 30 moves toward the stage 10, and sandwiches the banknote B with the stage 10. Thereafter, as illustrated in FIG. 3C, together with the pusher 30, the stage 10 moves to the conveyance position P12, which is close to the taking-in conveyance section 40, diagonally downward toward the front. Thus, as mentioned above, as illustrated in FIG. 6, the two first shutters 12 of the stage 10 open, and the first opening portions 11*a* are exposed. Then, in a state where the two pick rollers 41 of the taking-in conveyance section 40 protrude from the two first opening portions 11*a* provided in the stage 10, the banknote B is conveyed toward the conveyance section 111 illustrated in FIG. 1 by the taking-in conveyance section 40.

At the time when the banknote B is withdrawn, the discharge-scheduled number of banknotes B are conveyed to between the pusher 30 and the roof 20 by the discharge conveyance section 50 illustrated in FIG. 1, and thereafter, as illustrated in FIG. 4A, the pusher 30 moves toward the stage 10 together with the roof 20. At the time when such banknotes B are taken out, the pusher 30 forms the taking-out space S2 with the roof 20. At this time, the movable member 31 moves so as to be inclined toward the stage 10 in such a manner that the pressed protrusion 31*a* comes into contact with the stage 10 and is pressed against the elastic force of the above-described elastic body. Thus, the taking-out space S2 (between the pusher 30 and the roof 20) is widened toward the insertion/taking-out port 61, and accordingly, it is made easy for the customer to take out such a banknote B.

Herein, the stage 10 functions as an example of a second contact section that moves the movable member 31 toward the stage 10 by coming into contact with the movable member 31. Note that, as mentioned above, the movable member 31 may move so as to be inclined toward the stage 10 by, for example, the power of the driving means (not shown). Moreover, the movable member 31 may move so as to be inclined toward the stage 10 by coming into contact with a second contact section other than the stage 10. Further, the movable member 31 may come into contact with the stage 10 (the second contact section) by a portion thereof other than the pressed protrusion 31*a*.

Thereafter, the support member 91 that supports the banknote B moves toward the insertion/taking-out port 61. Then, the customer takes out the banknote B.

When the customer forgets to take out the banknote B, then as illustrated in FIG. 4B, the stage 10 moves to the conveyance position P12 diagonally downward toward the front, and in addition, the pusher 30 moves to the remaining banknote conveyance position P20 diagonally downward toward the front. Thus, as mentioned above, as illustrated in FIG. 6, the two first shutters 12 of the stage 10 open, and the first opening portions 11*a* are exposed. Moreover, as illustrated in FIG. 8, the two second shutters 34 of the pusher 30 open, and the second opening portions 33*a* are exposed. Further, the roof 20 also moves diagonally downward toward the front so as to sandwich the banknote B left between the roof 20 and the pusher 30.

Thereafter, in a state where the two pick rollers 41 of the taking-in conveyance section 40 protrude from the two first opening portions 11*a* provided in the stage 10 and the two second opening portions 33*a* of the pusher 30, the banknote B thus left is conveyed toward the conveyance section 111 illustrated in FIG. 1 by the taking-in conveyance section 40.

In the present embodiment described above, the automatic transaction apparatus 100 as an example of the paper sheet handling apparatus includes: the stage 10 (an example of the first facing section) and the roof 20 (an example of the second facing section), which are arranged so as to face each other with the insertion space S1 interposed therebetween, the insertion space S1 receiving the insertion of the banknote B (an example of the paper sheets) from the insertion/taking-out port 61 (an example of the taking-out port); and the taking-in conveyance section 40 (an example of the conveyance section) that conveys the banknote B, which is inserted into the insertion space S1, in a state of protruding to this insertion space S1 from the first opening portions 11*a* of the stage 10. The stage 10 includes the first shutters 12 which openably close the first opening portions 11*a*. The stage 10 is disposed so as to be movable to the insertion position P11 at the time when the banknote B is inserted and the conveyance position P12 at the time when the banknote B is conveyed by the taking-in conveyance section 40 in the facing direction D1 where this stage 10 and the roof 20 face each other. The stage 10 and the taking-in conveyance section 40 include the first shutter opening/closing units (for example, the two gears 13, the two gears 14, and the two racks 15, and the two racks 42) which open the first opening portions 11*a* by meshing with each other to open the first shutters 12 when the stage 10 moves from the insertion position P11 to the conveyance position P12.

As described above, even if the stage 10 is provided with the first opening portions 11*a* for allowing the penetration of the taking-in conveyance section 40 (the pick rollers 41), the first shutters 12 which close the first opening portions 11*a* are disposed, whereby the foreign object can be prevented from entering the inside of the banknote insertion/withdrawal unit 1 from the insertion space S1 of the banknote B through the first opening portions 11*a*.

Further, the first shutters 12 can be opened/closed in such a manner that the gears 13 of the stage 10 and the racks 42 of the taking-in conveyance section 40 mesh with each other, and accordingly, arrangement of driving means such as a motor, a power transmission mechanism that transmits power from the driving means to the first shutters 12, and the like can be omitted.

Hence, in accordance with the present embodiment, by a simple configuration, the entry of the foreign object from the insertion space S1 into which the banknote B (the paper sheet) is inserted from the insertion/taking-out port (the insertion port) can be prevented.

Moreover, in the present embodiment, the banknote insertion/withdrawal unit 1 includes the pusher 30 as an example of the partition section. This pusher 30 is disposed so as to be movable in the facing direction D1 where the stage 10 and the roof 20 face each other, forms the insertion space S1 with the stage 10, and forms, with the roof 20, the taking-out space S2 in which the banknote B is taken out from the insertion/taking-out port 61. The taking-in conveyance section 40 conveys the banknote B, which is left in the taking-out space S2, in a state of protruding to this taking-out space S2 from the first opening portions 11*a* of the stage 10 and the second opening portions 33*a* of the pusher 30, and the pusher 30 includes the second shutters 34 which openably close the second opening portions 33*a*.

Thus, the foreign object can be prevented from entering the inside of the banknote insertion/withdrawal unit 1 from the insertion space S1 of the banknote B through the second opening portions 33*a*.

Moreover, in the present embodiment, the pusher 30 is disposed so as to be movable to the remaining banknote conveyance position P20 at the time when the banknote B left in the taking-out space S2 is conveyed by the taking-in conveyance section 40. Moreover, the pusher 30 includes the second shutter opening/closing unit (for example, the two rollers 35, the two gears 36, and the two racks 37) which open the second opening portions 33*a* by opening the second shutters 34 when this pusher 30 is located at the remaining banknote conveyance position P20.

The pusher 30 is provided with the second opening portions 33*a* as described above, whereby the banknote B left in the taking-out space S2 can be conveyed by the taking-in conveyance section 40. Moreover, the second shutters 34 are closed when the pusher 30 is located at the position other than the remaining banknote conveyance position P20, whereby the foreign object can be prevented from entering the inside of the banknote insertion/withdrawal unit 1 through the second opening portions 33*a* of the pusher 30.

Note that the present invention is not limited to the above-mentioned embodiment as it is, and can be embodied by modifying components thereof. For example, a variety of inventions can be formed by appropriately combining the plurality of components disclosed in the present embodiment. As described above, varieties of modifications and applications can be made without departing from the spirit of the invention.

The invention claimed is:

1. A paper sheet handling apparatus comprising:

a first facing section and a second facing section which are arranged so as to face each other with an insertion space interposed therebetween, the insertion space having a paper sheet inserted from an insertion port; and a conveyance section that, in a state of protruding from a first opening portion of the first facing section toward the insertion space, conveys the paper sheet inserted into the insertion space, wherein the first facing section includes a first shutter that openably closes the first opening portion, the first facing section is disposed so as to be movable, in a facing direction where the first facing section and the second facing section face each other, to an insertion position at a time when the paper sheet is inserted and a conveyance position at a time when the paper sheet is conveyed by the conveyance section, the first facing section includes two first gears provided at respective ends in a left/right direction, which intersect with the facing direction and an insertion/take-out direction of the paper sheets, the gears being located at a lower end of the first facing section in the insertion/taking-out direction, the conveyance section includes two first racks that move in conjunction with the rotation of the two first gears, and the two first racks open the first opening portion by moving in conjunction with the rotation of the two first gears so as to open the first shutter when the first facing section moves from the insertion position to the conveyance position, the paper sheet handling apparatus further comprises a partition section that is disposed so as to be movable in the facing direction where the first facing section and the second facing section face each other, forms the insertion space with the first facing section, and forms, with the second facing section, a taking-out space in which the paper sheet is taken out from the insertion port, the conveyance section includes a pick roller that conveys, in a state of protruding to the taking-out space from the first opening portion of the first facing section and a second opening portion of the partition section, the paper sheet left in the taking-out space, the partition section includes a second shutter that openably closes the second opening portion, the partition section is disposed so as to be movable to a remaining banknote conveyance position at a time when the paper sheet left in the taking-out space is conveyed by the conveyance section, the partition section includes two rollers, two second gears, and two second racks, which open the second opening portion by opening the second shutter when the partition section is located at the remaining banknote conveyance position, the two rollers are biased toward a center in the left/right direction by guides of the paper sheet handling apparatus and move away from each other so as to be released from the biased state by the guides at the remaining banknote conveyance position, the two second gears rotate in conjunction with motions of the two rollers moving away from each other, and the two second racks mesh with the two second gears to open the second shutter.

* * * * *